United States Patent Office 2,863,872
Patented Dec. 9, 1958

2,863,872
CATALYTIC CYCLIZATION

Gerald A. Silverstone, Blackley, Manchester, England, assignor to Imperial Chemical Industries Limited, a corporation of Great Britain No Drawing. Application December 6, 1954
Serial No. 473,471

Claims priority, application Great Britain
December 16, 1953

5 Claims. (Cl. 260—290)

This invention relates to the catalytic cyclization of pentamethylene diamine to form piperidine.

According to the invention there is provided a process for the manufacture of piperidine which comprises contacting pentamethylene diamine in the vapor state with an acidic heterogeneous catalyst of the type used for promoting alkylation of aromatic compounds.

Catalysts of the type stated are well known and include, for example, silica gel, alumina-silica beads and boron phosphate.

The process of the invention may conveniently be performed by passing the vapor of pentamethylene diamine over the catalyst heated at a temperature of from about 300° to about 500° C. In order to exclude oxygen, which would cause the formation of undesirable by-products, an inert gas such as nitrogen or hydrogen may be passed through the reaction zone.

By the process of this invention, an excellent yield of piperidine is readily obtained from pentamethylene diamine.

If desired, the piperidine may be converted forthwith into pyridine by dehydrogenation and it is a further feature of this invention to perform this additional step almost simultaneously with the cyclization. In this embodiment of the invention, a known catalyst for the dehydrogenation of piperidine such as a platinum or palladium catalyst, is admixed with the cyclization catalyst and as the inert gas there is used hydrogen. In this connection it may be stated that by the term inert gas is meant a gas which does not promote the formation of undesirable by-products.

Thus by this further feature of the invention, pentamethylene diamine can be readily converted, in a simple one-stage process, into pyridine.

The invention is illustrated but not limited by the following examples in which parts and percentages are by weight.

Example 1

229 parts of pentamethylene diamine are vaporized and passed in admixture with a stream of nitrogen gas as a catalyst consisting of silica gel pellets maintained at a temperature of 400° C. The feed rate is such that the vapor is in contact with the catalyst bed for a period of 2.5 seconds. The liquid products are condensed in two traps, the first being maintained at 0° C., the second at the temperature of a mixture of solid carbon dioxide and methanol.

The total condensate (consisting of 153 parts of yellow liquid) on fractional distillation yields 119 parts of piperidine (62.3% of that possible from theory).

Example 2

229 parts of pentamethylene diamine are treated under the conditions of Example 1, the temperature in this case being 350° C., instead of 400° C.

Fractionation of the condensate (179 parts) yields 112 parts of piperidine (58.6% of theory).

Example 3

229 parts of pentamethylene diamine are treated under the conditions of Example 1, the catalyst consisting of alumina-silica beads maintained at 400° C. The condensed product (141 parts) yields 78 parts of piperidine (41% of theory).

Example 4

229 parts of pentamethylene diamine are vaporized and passed in admixture with a stream of hydrogen over a catalyst consisting of 5% of platinum metal deposited on pellets of silica gel and maintained at a temperature of 350° C. The feed rate is such that the vapor is in contact with the catalyst for a period of 2.4 seconds. The products are condensed as in Example 1.

The condensed liquid (134 parts by weight) on fractionation yields 98 parts of pyridine (55% of theory).

What I claim is:

1. Process for the manufacture of piperidine which comprises contacting pentamethylene diamine in the vapor state with an acidic heterogeneous catalyst of the type used for promoting alkylation of aromatic compounds, wherein said catalyst is selected from the group consisting of silica gel, alumina-silica beads, and boron phosphate.

2. The process of claim 1, wherein said catalyst is heated at a temperature of from about 300° to about 500° C.

3. A one-step process for the manufacture of pyridine from pentamethylene diamine which comprises contacting pentamethylene diamine in the vapor state with an acidic heterogeneous catalyst of the type used for promoting alkylation of aromatic compounds and selected from the group consisting of silica gel, alumina-silica beads, and boron phosphate, admixed with a dehydrogenation catalyst selected from the group consisting of platinum and palladium whereby said pentamethylene diamine is cyclized to form piperidine and said piperidine is substantially simultaneously dehydrogenated to said pyridine.

4. The process of claim 3, wherein said pentamethylene diamine is in admixture with an inert gas.

5. The process of claim 3, carried out within the temperature range of 300° C. to 500° C.

References Cited in the file of this patent

UNITED STATES PATENTS

| | | |
|---|---|---|
| 2,019,883 | Wulff | Nov. 5, 1935 |
| 2,184,235 | Groll | Dec. 19, 1939 |
| 2,765,310 | Horobin | Oct. 2, 1956 |
| 2,765,311 | Horobin | Oct. 2, 1956 |

OTHER REFERENCES

Karrer: Organic Chemistry, 2d ed., page 375, 1946.
Ladenburg: Berichte der Deutsche Chemische Gesellschaft, vol. 18, pages 3100–3102, 1885.
Ladenburg: Berichte, vol. 18, pages 2956–2961, 1885.
Ladenburg: Berichte, vol. 19, pages 780–785, 1886.
Wheland: Advanced Organic Chemistry, 2d. ed., pages 80–84, 1949.
Skita et al.: Berichte, vol. 45, page 3592, 1912.